United States Patent [19]

Hanson

[11] 4,410,238
[45] Oct. 18, 1983

[54] OPTICAL SWITCH ATTENUATOR

[75] Inventor: Eric G. Hanson, Burlingame, Calif.

[73] Assignee: Hewlett-Packard Company, Palo Alto, Calif.

[21] Appl. No.: 298,986

[22] Filed: Sep. 3, 1981

[51] Int. Cl.³ .............................................. G02F 1/13
[52] U.S. Cl. ................................. 350/347 E; 350/356
[58] Field of Search ............... 350/330, 331 R, 347 E, 350/353, 355, 356

[56] References Cited

PUBLICATIONS

Berezin, P. D. et al., "Liquid Crystal Deflector," *Soviet J. of Quantum Electronics*, vol. 4, No. 5 (Nov. 1974) pp. 693–694.

Ley, J. M., Comment in *Electronics Letters*, vol. 2, pp. 138–139 (Apr. 1966).

Ley, J. M. "Low-Voltage Light-Amplitude Modulation" *Electronics Letters*, vol. 2, p. 12 (1966).

*Primary Examiner*—John K. Corbin
*Assistant Examiner*—Richard F. Gallivan
*Attorney, Agent, or Firm*—Douglas A. Kundrat; Edward Y. Wong

[57] ABSTRACT

An optical switch having low insertion loss and low crosstalk is provided by two slabs of birefringent material having a polarization rotator as a control element interposed therebetween. By controlling the polarization rotator electrically, a selectable ratio of transmitted-to-displaced output optical power is realized. The optical switch therefore can function as an attenuator to a light beam traversing through it. In the preferred embodiment calcite crystals are used for the slabs, and a liquid crystal cell for the polarization rotator.

2 Claims, 4 Drawing Figures

OPTICAL SWITCH ATTENUATOR

BACKGROUND AND SUMMARY OF THE INVENTION

In optical systems, especially those using optical fiber cables, attenuators are typically required to vary the optical output power. One requirement of such an attenuator is that the waveform of the optical output is not affected. In the art, several approaches are being followed to achieve such an optical attenuator.

An example of one such approach is described by Richard A. Soref in *SPIE*, Vol. 176, *Guided Wave Optical Systems and Devices II*, (1979), pages 124–132, in an article entitled "Fibre-Optic Switching With Liquid Crystals." In accordance with this approach, attenuation is achieved by optical switching, that is, the optical output power is varied by diverting part or all of the optical output elsewhere. In this example, optical switching is based on total or partial optical reflection by a liquid crystal layer in response to electrical commands. Thus, by varying the amount of reflection, "attenuation" of the optical output is achieved. FIG. 1 illustrates this approach.

Still another approach is described by Wagner and Chang in "Electrically Controlled Optical Switch For Multimode Fiber Applications," *Applied Optics*, Vol. 19, No. 17, September 1980, pages 2921–2925. FIG. 2 illustrates this approach. The optical switch illustrated divides a light beam into two orthogonal polarizations, which are separated into different optical patterns by selective reflection; it then switches both polarizations simultaneously by rotating the planes of polarization and then recombines them at one of two possible output ports by selective reflection. By switching the optical output between two points, which, incidentally, are 90° apart, the optical output power in any one port varies from nearly nil to nearly 100 percent. Hence, an attenuation effect is achieved.

These two approaches are typical of the optical attenuators, or switches, in schemes involving partial or total optical reflection. These schemes have several disadvantages. Because they rely on reflections, reflective surfaces must be fabricated. This involves precisely ground and/or plated surfaces at precise angles. This presents a disadvantage in fabrication. Furthermore, because of the reflections, a disadvantage of high insertion loss results from these reflective switching schemes. Still another disadvantage is the amount of crosstalk in the switch due to the polarization impurity caused by the reflections. In other words, the separation by switching is degraded by the presence of crosstalk.

The optical switch in accordance with the preferred embodiment of the present invention minimizes these disadvantages in reflective switching attenuators. By not relying on reflective surfaces to accomplish optical switching in the attenuator, lower insertion losses are achieved. Furthermore, crosstalk separation of greater than 30 dB is realized because of better polarization purity with the novel switch.

The optical switch in accordance with the present invention displaces a light beam according to the beam's polarization. This displacement takes place in a high birefringent material, such as calcite. It then selectively rotates the polarization of the displaced beam by passing the beam through a rotator, such as a liquid crystal cell. Then, depending on the phase of the displaced beam, the beam is recombined at one port or is further displaced in accordance with its polarization. In this manner, an effective optical switch by beam displacement is realized.

DETAILED DESCRIPTION OF THE PREFERRED EMBODIMENT

Figure 1A:
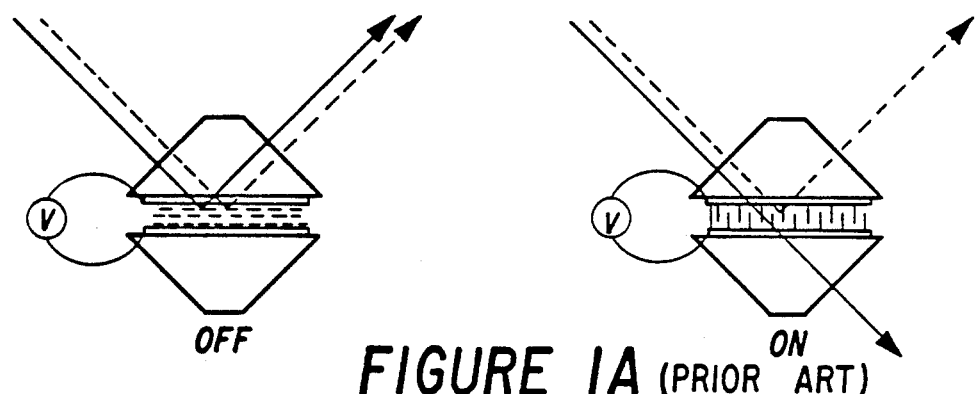
FIGS. 1 and 2 show an optical switch using reflections.
Figure 1B:
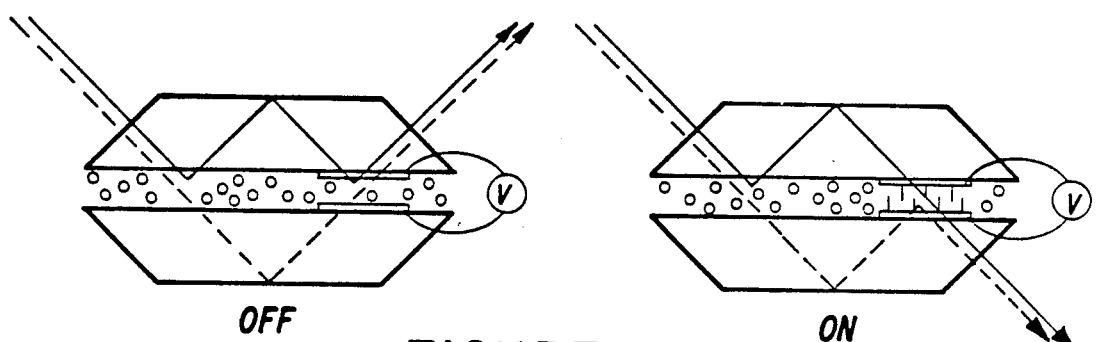
Figure 2:
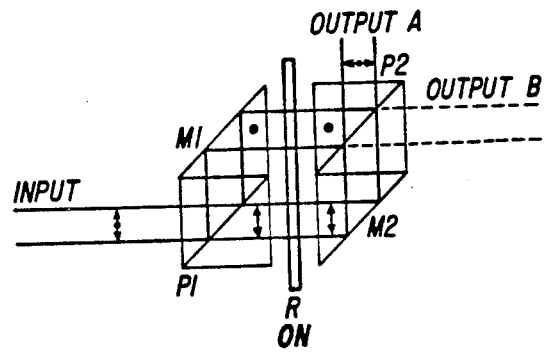
Figure 2:
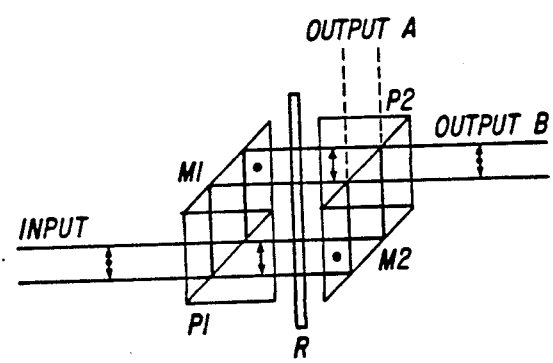
Figure 3:
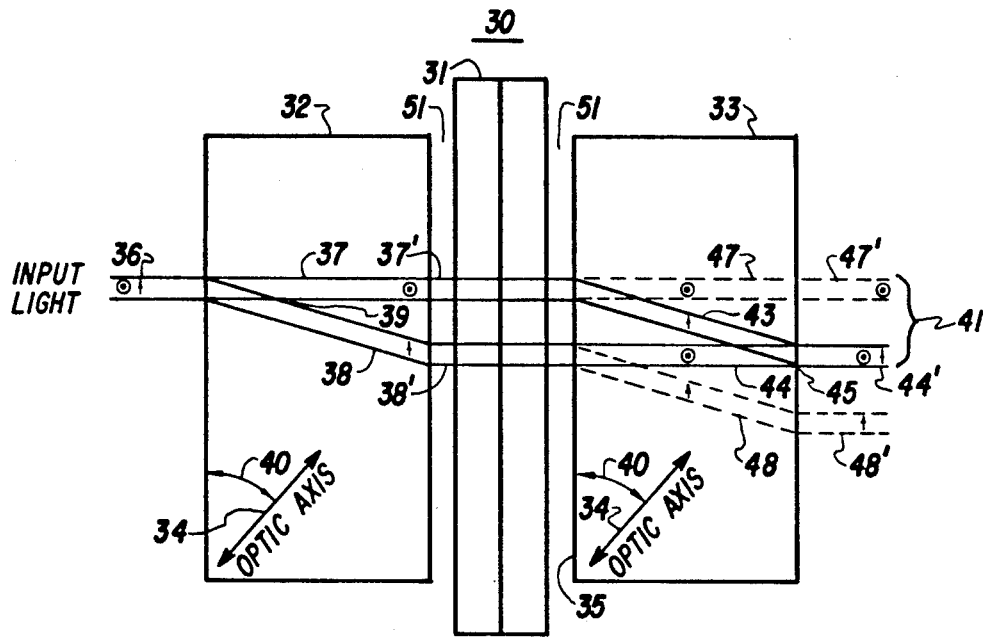
FIG. 3 shows the optical switch in accordance with the preferred embodiment of the invention.

An optical switch 30 in accordance with the present invention has a polarization rotator 31 interposed between two transmission media 32, 33 which are fabricated from birefringent material. In the preferred embodiment as shown in FIG. 3, the birefringent material 32, 33 used is calcite and the polarization rotator 31 is a liquid crystal cell. Although other materials can be used instead of calcite and liquid crystal cells, the following description will be made in terms of these examples only.

Slabs of calcite crystal 32, 33 are cut with an optic axis 34 in the plane as shown in FIG. 3, but at an angle 40 of approximately 41.9° to an entrance surface 35. As a result, an input beam 36 transmitted through slab 32 splits into an ordinary beam 37 which propagates straight along the surface normal and an extraordinary beam 38 which propagates at an angle 39 of approximately 6.23° to the normal. After traveling through a select thickness of the crystal slab 32, both beams 37, 38 emerge parallel to the normal but with a slight separation or displacement 41. For example, if the thickness is made 5 millimeters, then one beam is displaced to effectuate a separation of substantially 550 microns.

The emergent parallel beams 37', 38' then pass through a liquid crystal cell 31. In the preferred embodiment, the liquid crystal cell 31 is a standard twisted-nematic cell and is identical to those used in watches and calculators in all respects except for size. This cell 31 causes no further deflection of either beam 37', 38', but it does modify the polarization of the two beams 37', 38'. When no voltage is applied to the cell 31, the polarization of each is rotated by 90° as the beam passes through the cell 31. When these beams 37', 38' traverse a second calcite crystal 33, which is cut identically to the first crystal 32, they follow paths indicated by the solid lines 43, 44 in FIG. 3. This occurs because of the polarization rotation. One beam is again displaced in the second calcite slab 33, and the two beams 43, 44 recombine at the output port 45 to form a single output 44'.

Figure 4:
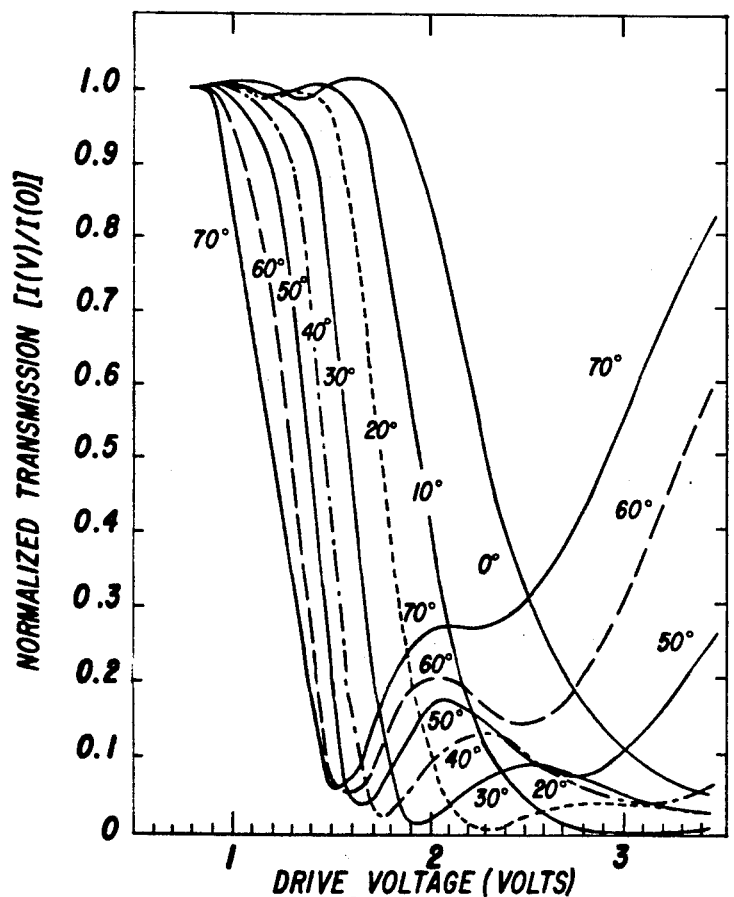
FIG. 4 shows the transmission of light (at several incidence angles) through a typical liquid crystal cell in the principal viewing plane for various applied voltage.

As the voltage on the liquid crystal cell is increased, an increasing proportion of the power in each beam emerges from the liquid crystal cell 31 with its polarization unrotated, and a decreasing proportion of the power has a 90 polarization rotation. When the beams 37', 38' traverse the second calcite crystal 33, the portions with unrotated polarization follow the paths indicated by the dotted lines 47, 48, and emerge from the second crystal as two side beams 47', 48' displaced from the central beam, for example, by 550 microns in the present instance. Though displaced, the two side beams still parallel the central beam 44'. Therefore, the net effect of increasing the voltage is to reduce the power in the central beam 44' and to increase the power in the side beams 47', 48'. The fraction of the power coupled into the central beam 44' follows the voltage dependence curves exemplified in FIG. 4. In other words, for a liquid crystal cell 31 oriented normal to the beam 36 as in FIG. 3, the transmission is a monotonically decreasing function of voltage. FIG. 4 also shows transmission versus voltage curves for liquid crystal cells tilted non-normal to the beam. In these cases, the high attenuation condition is achieved at lower voltages, although the curves are no longer monotonic. The curves in FIG. 4 apply to one specific liquid crystal material and twisted nematic cell structure, but the general shape of the curves is the same for other liquid crystal materials and twisted nematic cell structures.

In the preferred embodiment, each of the calcite crystal slabs 32, 33 is potted with silicone in a brass sleeve (not shown). Glass cover slips (not shown) are mounted on each sleeve, so that the entrance and exit faces, or planes of incidence or emergence, respectively, of each calcite slab are covered with the glass. The sleeves and the twisted nematic liquid crystal cell are all mounted in a brass housing (not shown), and the gap 51 between them is filled with silicone potting (not shown).

To understand better the advantages of less insertion loss and higher separation realized with the optical switch in accordance with the present invention, a discussion of possible sources of losses follows.

In the high attenuation state, the liquid crystal cell 31 is fully activated and does not rotate the polarization of either of the two input beams 37', 38'. If the optimal voltage is chosen and applied to the cell, the linear polarization of each beam is nearly perfectly preserved after passing through the cell 31. It has been found that even at the optimal voltage, depolarization ranging from −30 dB to −50 dB results for varying cell twist angles. At 90.0° twist the depolarization is less than −50 dB, while a 1.0° twist error (i.e., 89.0° or 91.0° twist) results in −40 dB depolarization. A 3° twist error (i.e., 87° or 93° twist) results in a −30 dB depolarization. The twist angle tolerance on typical commercial cells is ±3°. This would hold the depolarization and, therefore, the contrast to less than −30 dB. To achieve a wider dynamic range, a tighter twist tolerance is required.

The orientation of the two calcite slabs 32, 33 can also affect contrast. Specifically, the optic axis 34 in the two crystals 32, 33 must be parallel. If the parallelism is disturbed by the rotation of one of the crystals, for example, by an angle α with respect to its surface normal, the polarization directions of the ordinary and the extraordinary beams will differ by the angle α in the two crystals. As a result, the lowest possible transmission coefficient will be $\sin^2\alpha$. To achieve −50 dB attenuation requires α to be less than 0.18° (3.2 mrad), while −30 dB requires α to be less than 1.8° (32 mrad). Since an orientation of the slabs 32, 33 to a precision better than 1.8° can be easily accomplished with simple existing techniques, achieving a high attenuation in accordance with the present invention is therefore not difficult.

Positioning the calcite slabs 32, 33 and the liquid crystal 31 relative to one another in the preferred embodiment is not critical. For example, side to side positioning of the entire calcite/liquid crystal cell assembly 30 does not critically affect contrast, if the beam is not apertured. Similarly, an overall angular tilt in the assembly does not critically affect the switching effectiveness.

Scattering of light has a relatively small effect on contrast; the fraction of light scattered in a 10 micron thick liquid crystal 31, for example, is only −23 dB relative to the beam intensity. Furthermore, only the half of this scattered light (i.e., −26 dB) having a polarization opposite to that of the main beam causes a contrast degradation. In addition, this light is scattered at large angles from the beam direction, that is, at angles up to approximately 20°. Typically, an optical fiber is used to receive the output light beam. Since the output optical fiber subtends less than 0.1 percent of the cone of scattered light, scattered depolarized light is less than −50 dB in the fiber.

Reflections also do not affect the contrast, because each of the two beams 37', 38' is linearly polarized. Its polarization would remain unchanged, even if it suffered a double reflection. Therefore, it would still exit the device at the same place as the unreflected component. This results in the advantages of having no contrast reduction.

I claim:
1. An apparatus for selectively attenuating the power of an unpolarized input light beam, the apparatus comprising:
   a first transmission medium of birefringent calcite for receiving the input light beam and for splitting said input light beam into ordinary and extraordinary beams having orthogonal polarizations;
   a liquid crystal cell having a first surface adjacent to said first transmission medium for receiving said ordinary and extraordinary beams and for selectively rotating the polarization of a portion of each of said beams by 90 degrees; and,
   a second transmission medium of birefringent calcite adjacent to a second surface of the liquid crystal cell, said second transmission medium being operative for receiving the rotated ordinary and extraordinary beams and for splitting said rotated ordinary beam into first and second beams having orthogonal polarizations and for splitting said rotated extraordinary beam into third and fourth beams having orthogonal polarizations such that an unpolarized output light beam is formed from a combination of the second and third beams and the power of said output light beam is variable from substantially zero to substantially the power of the input light beam.

2. A method for selectively attenuating the power of an unpolarized input light beam, the method comprising the steps of:
   displacing the input light beam in a calcite slab to form ordinary and extraordinary light beams;
   receiving said ordinary and extraordinary light beams in a liquid crystal cell and rotating therein a selected portion of the ordinary and extraordinary light beams by 90 degrees;
   splitting said ordinary light beam in another calcite slab to form first and second beams having orthogonal polarizations;
   splitting said extraordinary light beam in the other calcite slab to form third and fourth beams having orthogonal polarizations;
   combining said second and third beams into an unpolarized output light beam;
   selecting the portion of the ordinary and extraordinary light beams which are rotated such that a ratio of the power of the output light beam to the power of the input light beam is variable from substantially zero to substantially unity.

* * * * *

UNITED STATES PATENT AND TRADEMARK OFFICE
CERTIFICATE OF CORRECTION

PATENT NO. : 4,410,238

DATED : October 18, 1983

INVENTOR(S) : Eric Gregory Hanson

It is certified that error appears in the above—identified patent and that said Letters Patent is hereby corrected as shown below:

Column 2, line 38, delete "made".

Column 2, line 60, delete "90" and add --90°--.

Signed and Sealed this

Tenth Day of July 1984

[SEAL]

Attest:

GERALD J. MOSSINGHOFF

Attesting Officer

Commissioner of Patents and Trademarks